United States Patent
Choi et al.

(10) Patent No.: US 9,225,012 B2
(45) Date of Patent: Dec. 29, 2015

(54) ELECTRODE OF SECONDARY CELL INCLUDING POROUS INSULATING LAYER, AND MANUFACTURING METHOD THEREOF

(75) Inventors: Jae Hoon Choi, Gyeonggi-do (KR); Sa Heum Kim, Gyeonggi-do (KR); Dong Gun Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 1077 days.

(21) Appl. No.: 13/186,979

(22) Filed: Jul. 20, 2011

(65) Prior Publication Data

US 2012/0141877 A1    Jun. 7, 2012

(30) Foreign Application Priority Data

Dec. 6, 2010    (KR) ........................ 10-2010-0123551

(51) Int. Cl.

| | |
|---|---|
| *H01M 2/16* | (2006.01) |
| *H01M 4/139* | (2010.01) |
| *H01M 4/04* | (2006.01) |
| *H01M 2/14* | (2006.01) |
| *H01M 4/13* | (2010.01) |
| *H01M 4/62* | (2006.01) |
| *H01M 10/0525* | (2010.01) |

(52) U.S. Cl.
CPC .............. *H01M 4/139* (2013.01); *H01M 2/145* (2013.01); *H01M 2/1646* (2013.01); *H01M 2/1673* (2013.01); *H01M 2/1686* (2013.01); *H01M 4/0404* (2013.01); *H01M 4/13* (2013.01); *H01M 4/621* (2013.01); *H01M 10/0525* (2013.01); *Y02E 60/122* (2013.01)

(58) Field of Classification Search
CPC . H01M 4/139; H01M 4/0404; H01M 2/1686; H01M 2/1646; H01M 2/145
See application file for complete search history.

(56) References Cited

U.S. PATENT DOCUMENTS

| | | | | |
|---|---|---|---|---|
| 5,834,052 | A | * | 11/1998 | Fukumura et al. .............. 427/58 |
| 2006/0188785 | A1 | * | 8/2006 | Inoue et al. .................... 429/246 |
| 2010/0273045 | A1 | * | 10/2010 | Hasegawa et al. ............ 429/163 |

FOREIGN PATENT DOCUMENTS

| | | |
|---|---|---|
| CN | 1820383 A | 8/2006 |
| CN | 101897072 A | 11/2010 |
| JP | 07220759 A | 8/1995 |
| KR | 10-2006-0041649 | 5/2006 |
| KR | 10-2007-0086818 | 8/2007 |

\* cited by examiner

*Primary Examiner* — Zachary Best
(74) *Attorney, Agent, or Firm* — Mintz Levin Cohn Ferris Glovsky and Popeo, P.C.; Peter F. Corless

(57) ABSTRACT

The present invention provides a manufacturing method of a secondary cell electrode forming a porous insulating layer on at least one surface between a negative electrode and a positive electrode, including coating an electrode layer slurry on the electrode surface, coating the porous insulating layer while in a state in which the electrode layer slurry has not been dried, and simultaneously drying the electrode layer slurry and the porous insulating layer coating slurry so a binder of the porous insulating layer does not block the pores of the electrode layer.

10 Claims, 8 Drawing Sheets

PRIOR ART

ELECTRODE OF SECONDARY CELL INCLUDING POROUS INSULATING LAYER, AND MANUFACTURING METHOD THEREOF

CROSS-REFERENCE TO RELATED APPLICATION

This application claims priority to and the benefit of Korean Patent Application No. 10-2010-0123551 filed in the Korean Intellectual Property Office on Dec. 6, 2010, the entire contents of which are incorporated herein by reference.

BACKGROUND OF THE INVENTION (a) Field of the Invention

The present invention relates to an electrode and a manufacturing method thereof for a secondary cell (rechargeable battery). More particularly, the present invention relates to an art that introduces a porous insulating layer including an inorganic compound, etc., to the surface of the electrode and simultaneously dries an electrode layer slurry and the porous insulating layer by applying the electrode layer slurry in order to prevent the binder of the porous insulating layer from blocking pores in a state in which the electrode layer slurry has not been dried after the electrode layer slurry is applied.

(b) Description of the Related Art

A secondary cell (rechargeable battery) is generally a chemical cell that can be repeatedly charged and discharged by reversibly interconverting chemical energy and electrical energy, and includes four fundamental elements such as a positive electrode, a negative electrode, a separator, and an electrolyte.

The positive electrode and the negative electrode actually convert and store oxidation/reduction energy, and have a positive potential and a negative potential, respectively. The separator is located between the positive electrode and the negative electrode in order to electrically insulate them and provide a movement path for a charge, and the electrolyte acts as a medium for charge transmission. An electrode material is the actual reacting material among the component materials is also called an active material.

A positive electrode material can intercalate, e.g., lithium ions, and a negative electrode material can be a compound in which, e.g., lithium metals, alloys, and lithium ions can be intercalated. The separator typically has a shape of a porous polymer layer or a non-woven fabric and is a single layer or is formed with multiple layers.

If a liquid electrolyte including an organic solvent and a salt is used, a movement path for ions moving between the positive electrode and the negative electrode during charge and discharge of the cell can be provided. The organic solvent improves the degree of dissociation for ions by increasing the polarity of the electrolyte. Further, it is preferable that a material with high polarity and that is nonreactive to lithium metal is used as the organic solvent in order to facilitate the conductivity of ions by lowering the local viscosity near the ions.

Hereinafter, the conventional electrode manufacturing process will be described.

The electrode manufacturing process generally includes five steps such as material weighing, mixing, coating, drying, and pressing. The material weighing is a step in which the electrode element materials according to a predetermined ratio are weighed, and the mixing is a step in which the electrode element materials are dissolved, dispersed, and kneaded in accordance with a predetermined order.

The materials are generally in a slurry form after the mixing process, and are then input to the coating process. That is, the mixed slurry includes the electrode element materials and a dispersion medium, and the electrode element materials include different electrode materials (active materials), a conductive material, a binder, and additives.

The coating and drying process, as shown in FIG. 1, is performed in such a manner that the electrode that is uncoiled from an unwinder 10 is coated while passing a coater 20 and is then wound again on a rewinder 40 after moving through a dryer 30.

The mixing process is a process in which the electrode element materials are dissolved, dispersed, and kneaded, and the levigated electrode element materials such as electrode materials, conductive materials, and polymer binders are also dry-mixed in a sealed container and then dissolved or dispersed in a solvent of the polymer binders or a dispersion medium.

The coating and drying process is a process in which the slurry formed by mixing the above materials is coated on a current collector and dried, and then an electrode only including solid content is obtained. The electrode is manufactured in a bar shape. The current collector is a material that collects electrons obtained from an oxidation/reduction reaction of the electrode material and causes them to flow into an outer conductor line. The pressing process is a process in which a predetermined pressure is exerted on the completely dried or semi-dried electrode obtained from the coating and drying process.

As described above, the electrode is finally finished through material weighing, mixing, coating, drying, and pressing steps.

However, there are stability issues with respect to manufacturing of secondary cells, and in particular, lithium secondary cells manufactured via processes having a high energy density and utilizing combustibles such as an organic solvent.

As a result of the instability, major accidents have occurred from an abnormally high temperature caused by a short circuit between the positive electrode and the negative electrode. That is, under normal conditions, the separator located between the positive electrode and the negative electrode maintains an electrical insulation state, but as there is a limit in the amount of energy a conventional separator can absorb, if the cell is overcharged or overdischarged, if dendritic growth of the electrode material or a foreign material causes an internal short circuit, if a sharp object such as a nail or a screw penetrates the cell, or if the cell is deformed by an external force, the temperature may be dramatically increased thus causing, e.g., an explosion.

A micro-porous layer consisting of a polyolefin resin is usually used as a separator, but the heat-resistance property of this layer is insufficient because the heat-resistance temperature is only about 120 to 160 degrees Celsius. Therefore, if an internal short circuit occurs, the separator contracts and the short circuit portion is enlarged, and then a problem that thermal runaway in which much more reaction heat is generated.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides an electrode of a secondary cell including a porous insulating layer and a manufacturing method thereof having advantages of simplifying a process and improving stability of the cell.

An exemplary embodiment of the present invention provides a manufacturing method of a secondary cell electrode forming a porous insulating layer on at least one surface between a negative electrode and a positive electrode, including coating an electrode layer slurry on the electrode surface, coating a porous insulating layer in a state in which the electrode layer slurry has not been dried, and simultaneously drying the electrode layer slurry and the porous insulating layer slurry.

The porous insulating layer may be coated with only an inorganic compound powder or a mixed powder of the inorganic compound powder and functional inorganic compound additives. The porous insulating layer may be coated with the porous insulating layer coating slurry containing a solvent of a polymer binder. The solvent of the polymer binder for the porous insulating layer coating slurry and a solvent of the polymer binder for the electrode layer slurry are volatile and are good solvents.

Alternatively, the porous insulating layer may be coated with the porous insulating layer coating slurry containing a polymer binder, and the solvent of the polymer binder for the porous insulating layer coating slurry and a solvent of the polymer binder for the electrode layer slurry may be volatile and are poor solvents or nonsolvents.

Further, the electrode may contain an active material, a conductive material, a polymer binder, and additives. The active material is at least one of a graphite series or a carbon series when the electrode is a negative electrode, and the active material is at least one of a transition metal-oxide series, a transition metal-phosphate series, a transition metal-silicate series, a transition metal-sulphate series, or polymer materials when the electrode is a positive electrode. Additionally, the conductive material is at least one of graphite, carbon black, activated carbon, carbon nanotubes, and carbon nanofiber.

The polymer binder is at least one of a copolymer of polyvinylidene fluoride, vinylidene fluoride, heaxfluoropropylene, a copolymer of vinylidene fluoride, maleic anhydride, polyvinyl chloride, polyvinyl alcohol, polyvinyl formal, polymethylmethacrylate, polymethacrylate, tetraethylene glycol diacrylate, cellulose triacetate, polyurethane, polysulfone, polyether, polyolefine, polyethylene oxide, polyisobutylene, polybutyldiene, polyacrylonitrile, polyimide, acrylonitrile-butadiene rubber, styrene-butadiene rubber, an ethylene-propylene-diene monomer, polydimethylsiloxane, and polysilicone.

The solvent of the polymer binder is at least one of N-methylpyrrolidinone, dimethylformamide, dimethylacetamide, hexamethylphosphoramide, acetonitrile, acetone, cyclohexanone, dimethylsulfoxide, tetrahydrofuran, dioxane, chloroform, dichloromethane, and water. The poor solvent or good solvent is at least one of N-methylpyrrolidinone, water, ethanol, propanol, butanol, pentanol, hexanol, ethylene glycol, glycerol, acetone, dimethylether, diethylether, ethylacetate, and dichloromethane.

The inorganic compound powder is at least one of $SiO_2$, $Al_2O_3$, $TiO_2$, $SnO_2$, $ZnO$, $CeO_2$, $ZrO_2$, $BaTiO_3$, and $Y_2O_3$. The size of the inorganic compound powder is about 0.001 to 1 micron. The content of the inorganic compound powder is about 10 wt % or more of the solid content of the porous insulating layer. The additives of the functional inorganic compound include at least one of $AlX_3$, $MgX_2$, and $SnX_2$, wherein X is a halogen. The additives of the functional inorganic compound are included at about 0.1 to 10 wt % of the solid content of the porous insulating layer. The coating thickness of the porous insulating layer after drying is about 1 to 10 microns. The porous insulating layer is dried at about 50 to 200 degrees Celsius.

An exemplary embodiment of the present invention provides an secondary cell electrode with a porous insulating layer formed on at least one surface between a negative electrode and a positive electrode on which an electrode layer slurry is coated on the electrode surface, a porous insulating layer slurry is coated on the electrode layer slurry in a state in which the electrode layer slurry has not been dried, and the electrode layer slurry and the electrode layer slurry are simultaneously dried so a binder of the porous insulating layer does not block the pores of the electrode layer.

As described above, the present invention can integrally connect the electrode layer and the porous insulating layer, and can simplify the forming process of the porous insulating layer by shortening the conventional coating-drying of the electrode layer and the porous insulating layer to three steps of coating the electrode layer, coating the porous insulating layer, and drying.

The porous insulating layer slurry or inorganic compound powder, in a state in which the electrode layer has not been dried and a solvent still remains, is coated and dried, and an integrally connected porous structure is formed in a process in which the porous insulating layer solvent and the electrode layer solvent are simultaneously volatilized. The porous insulating layer is coated when the electrode layer has not yet been dried, so an electrode layer polymer binder and a porous insulating layer polymer binder can be more easily settled, thus providing stronger structural stability of the porous insulating layer.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DETAILED DESCRIPTION OF THE EMBODIMENTS

Hereinafter, exemplary embodiments of the present invention will be described in detail, referring to the accompanying drawings.

Figure 1:
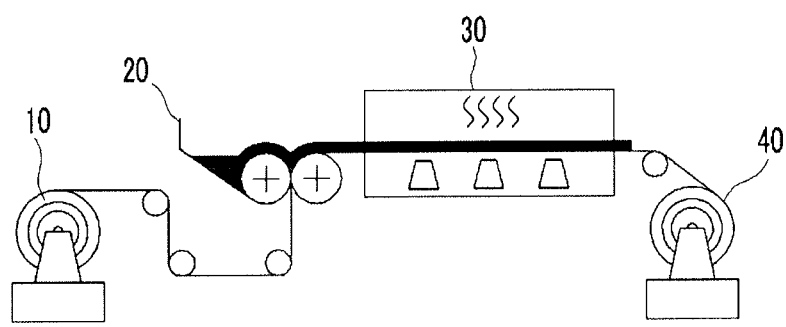
FIG. 1 a schematic diagram of the conventional electrode manufacturing process.
Figure 4:
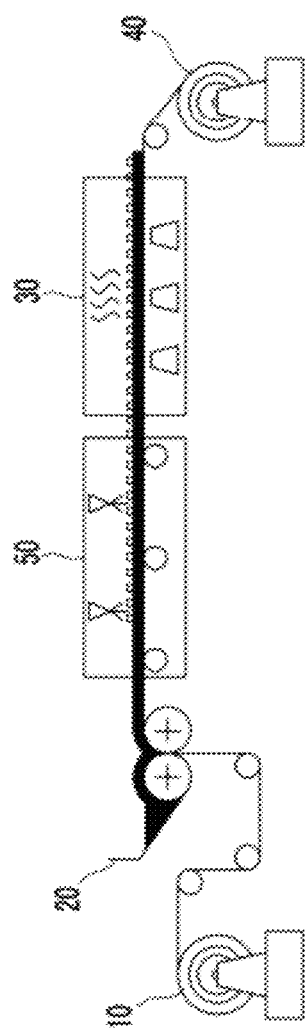
FIG. 4 a schematic diagram of an electrode including a porous insulating layer according to an exemplary embodiment of the present invention.

FIG. 4 shows an application process diagram of a porous insulating layer according to an exemplary embodiment of the present invention, and it is the same as FIG. 1 except for a sprayer 50 has been added.

Figure 3:
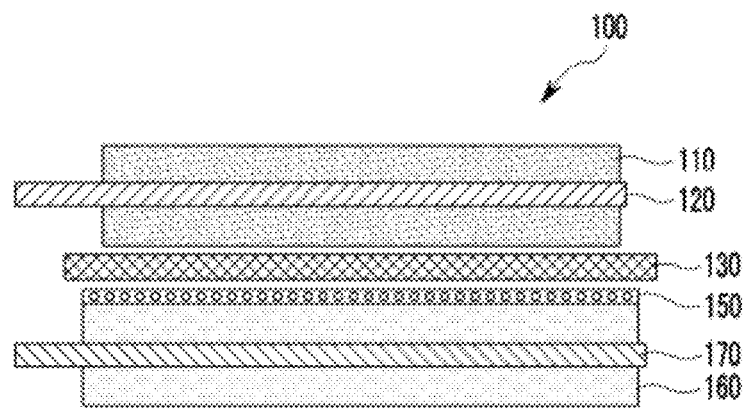
FIG. 3 a cross-sectional view of an electrode according to an exemplary embodiment of the present invention.

Also, FIG. 3 is showing an electrode 100 according to an exemplary embodiment of the present invention, and in particular, it is a cross-sectional view of a secondary cell using a negative electrode 160. It shows a laminated material with the negative electrode 160, a negative current collector 170, a porous insulating layer 150, a separator 130, a positive electrode 110, and a positive current collector 120.

A coating method of the porous insulating layer on the surface of the electrode layer according to an exemplary embodiment of the present invention will now be described.

First, there is a method in which the porous insulating layer on the surface of the electrode layer is only coated with an inorganic compound powder, and a method in which the porous insulating layer on the surface of the electrode layer is coated with a mixed powder including functional inorganic compound additives.

Second, a polymer binder is introduced to a porous insulating layer, and a polymer binder solvent of the porous insulating layer coating slurry and a polymer binder solvent of the electrode layer slurry are volatile and compatible, and can be mixed.

Third, a polymer binder is introduced to a porous insulating layer, and a polymer binder solvent of the porous insulating layer coating slurry and a polymer binder solvent of the electrode layer slurry are volatile and are poor solvents or non-solvents for each other, and can be mixed.

Subsequently, a common electrode layer manufacturing process is applied. First, the electrode powders are dry-mixed in a container sealing the levigated electrode element materials such as an electrode material, a conductive material, and a polymer binder therein, and then they are dissolved and dispersed in the polymer binder. Any mixing process can be applied if it is usually used. In particular, it is preferable that a magnetic stirrer, a mechanical stirrer, an oil stirrer, or an ultrasonic wave stirrer is used. Any electrode material can be applied if it is used for a secondary cell, in particular, a lithium secondary cell. It is preferable that in the case of a negative electrode material, a graphite series material such as artificial graphite and natural graphite or a carbon series material such as hard carbon and soft carbon is used. In the case of a positive electrode material, as described above, it is preferable that a transition metal-oxide series, a transition metal-phosphate series, a transition metal-silicate series, a transition metal-sulphate series, or a polymer material is used.

Any material can be applied as a conductive material if it is usually used for a secondary cell, in particular, a lithium secondary cell. Therefore, it is preferable that a carbon series material such as graphite, carbon black, activated carbon, carbon nanotubes, carbon nanofiber, etc., is used.

Almost all the usual polymers can be used as a polymer binder, and in particular, it is preferable that a mixture or a copolymer of at least one of polyvinylidene fluoride, a copolymer of vinylidene fluoride and heaxfluoropropylene, a copolymer of vinylidene fluoride and maleic anhydride, polyvinylchloride, polyvinyl alcohol, polyvinyl formal, polymethylmethacrylate, polymethacrylate, tetraethylene glycol diacrylate, cellulose triacetate, polyurethane, polysulfone, polyether, a polyolefine such as polyethylene or polypropylene, polyethylene oxide, polyisobutylene, polybutyldiene, polyacrylonitrile, polyimide, acrylonitrile-butadiene rubber, styrene-butadiene rubber, an ethylene-propylene-diene monomer, polydimethylsiloxane, and polysilicone is used.

Also, it is preferable that a mixture of at least one of N-methylpyrrolidinone, dimethylformamide, dimethylacetamide, hexamethylphosphoramide, acetonitrile, acetone, cyclohexanone, dimethylsulfoxide, tetrahydrofuran, dioxane, chloroform, dichloromethane, and water is used as a solvent of the polymer binder.

Further, it is preferable that a mixture of at least one of N-methylpyrrolidinone, water, ethanol, propanol, butanol, pentanol, hexanol, ethylene glycol, glycerol, acetone, dimethylether, diethylether, ethylacetate, and dichloromethane is used as a poor solvent or a non-solvent of the polymer binder.

An inorganic compound powder is a typical ceramic particle generally used in the art, so the powder is not limited if it is stable at an operation voltage of a cell (e.g., 0 to 5 V, standard for Li/Li+)

The inorganic compound powder has a strong mechanical characteristic and excellent heat resistance at a high temperature. If it is located at the surface of the electrode layer, heat due to electrical, mechanical, and environmental abuse that typically would cause contraction and deformation of the separator and deteriorated safety by an internal short circuit between the positive electrode and the negative electrode does not occur, so it manifests very stable characteristics.

The inorganic compound powder can be $SiO_2$, $Al_2O_3$, $TiO_2$, $SnO_2$, $ZnO$, $CeO_2$, $ZrO_2$, $BaTiO_3$, $Y_2O_3$, etc., and a mixture of at least two of these inorganic compound powders can be used.

The size of the inorganic compound powder is not limited, but about 0.001 to 1 micron is preferable to maintain uniform dispersion, thickness control of the coating layer, and an appropriate pore ratio.

If the size of the inorganic compound powder is less than about 0.001 microns, dispersibility may be deteriorated and it is difficult for a porous insulating layer slurry to be manufactured or to be uniformly coated on the surface of an electrode layer. If the size of the inorganic compound powder is more than about 1 micron, a coating process is not smoothly performed and the size of pores formed in the porous insulating layer is very large, and it is difficult to appropriately control the thickness of the porous insulating layer.

Also, the content of the inorganic compound powder may preferably be more than 10 wt % of the solid content of the porous insulating layer (inorganic compound+polymer binder), and it is more preferable for the content to be more than 30 wt %. If the content of the inorganic compound is less than 10 wt %, the enhancement of heat resistance or mechanical characteristics due to the inorganic compound coating cannot be expected.

Functional inorganic compound additives may also be added in order to enhance a life-time characteristic and an efficiency characteristic by forming a uniform solid electrolyte interface on the surface of the electrode while charging/discharging the battery. These functional inorganic compound additives can be for example $AlX_3$, $MgX_2$, or $SnX_2$ (X is a halogen).

A more detailed function of the functional inorganic compound additives is to improve the life-time characteristic of a lithium secondary cell by forming protection through reaction with lithium ions during charging/discharging, or by forming a protective layer. Preferably, the content of the functional inorganic compound is about 0.1 to 10 wt % of the porous insulating layer solid content (inorganic compound+functional inorganic compound+polymer binder).

If the content of the functional inorganic compound is less than about 0.1 wt %, a solid electrolyte interface on an electrode surface is not sufficiently formed so that the enhancement of the life-time characteristic cannot be expected. And if the content of the functional inorganic compound is more than about 10 wt %, manufacturing costs rise.

For this, in the present invention, the slurry is manufactured by completely dissolving and uniformly dispersing the polymer binder, and mixing it with the electrode element material. The slurry is then poured onto a foil, which is a current collector, and the slurry is coated in a layer while being controlled at a predetermined thickness.

The coating process may be any method in which the slurry can be manufactured in a layer, preferably, a comma method, a slit die method, a gravure method, a doctor blade method, a silk screen method, an offset method, a spray method, or a dip method can be used. It is preferable that the thickness of the porous insulating layer after drying is about 1 to 10 microns, and it is more preferable that it is about 2 to 7 microns.

If the coating thickness after drying is less than about 1 micron, the porous insulating layer cannot sufficiently function and it cannot contribute to enhancement of safety, and if the coating thickness is more than about 10 microns, the safety can be further improved, but inner resistance of the cell increases and performance of the cell is impeded.

Hereinafter, the coating method of the porous insulating layer will be described in detail. First, a powder coating method according to the first exemplary embodiment of the present invention will be described. For coating the powder, an inorganic compound must be coated or a mixed powder of the inorganic compound and a functional inorganic compound additive must be coated on the surface of the electrode layer before the coated electrode layer slurry is completely dried. When the mixed powder is coated, it is dry-mixed with the inorganic compound and the functional additives in a closed container in advance, and then it is poured in a coating step.

Alternatively, any powder coating method can be used if it is usually used in the art, and it can be used in the same method or in a partially varied method thereof, and in particular, a spray method is advisable.

Hereinafter, a good solvent slurry coating according to the second exemplary embodiment of the present invention will be described. By good solvent it is meant that the slurry coating is able to dissolve things well and is thus, has a high degree of solubility.

For the good solvent slurry coating, a single inorganic compound or a mixed powder of an inorganic compound and a functional inorganic compound additive is dissolved and dispersed in a polymer binder. When the mixed powder is used, the inorganic compound and the functional additives are dry-mixed in a closed container in advance, and then it is poured in a slurry mixing step. The slurry mixing may be performed by the same method with which the electrode layer slurry is mixed.

The polymer binder is completely dissolved and is uniformly dispersed and mixed with the element material of the porous insulating layer. The porous insulating layer slurry should be coated on the surface of the electrode layer before the electrode layer slurry is completely dried. The porous insulating layer coating is performed by the same method with which the electrode layer is coated, and any method that does not harm the electrode layer slurry, preferably a spray method, may be used.

Hereinafter, a poor solvent of a non-solvent slurry coating according to the third exemplary embodiment of the present invention will be described. For the non-solvent or the poor solvent slurry coating, a single inorganic compound or a mixed powder of the inorganic compound and the functional inorganic compound additives is dissolved and dispersed in the polymer binder. When the mixed powder is used, the inorganic compound and the functional additives are dry-mixed in a closed container in advance, and then it is poured in a slurry mixing step.

Slurry mixing can be performed using the same method as the mixing method for the electrode layer slurry. Differential, however, in comparison with the second exemplary embodiment with respect of the selection of the solvent and polymer binder is that the polymer binder solvent of the porous insulating layer coating slurry is a poor solvent or a non-solvent for the polymer solvent of the electrode layer slurry. During this process, the polymer binder is completely dissolved and is uniformly dispersed and mixed with the porous insulating layer element material, and then the porous insulating layer is coated before the electrode layer slurry is completely dried.

The porous insulating layer coating may be performed using the same method as the coating of the electrode layer, and any method that does not harm the electrode layer slurry, preferably a spray method, may be used.

The electrode coated with the electrode layer on the current collector and the porous insulating layer according to the first, second, and third exemplary embodiments is transferred into the dryer 30, and the solvent is removed by completely drying the electrode layer and the porous insulating layer. The drying is performed via, e.g., a hot-air method, a direct heating method, an induction heating method, etc., according to a temperature at which all the solvents can volatilize.

It is preferable that the temperature is about 50 to 200 degrees Celsius. If the temperature is lower than about 50 degrees Celsius, an excessive amount of time for drying is required and the drying can be incomplete, and if the temperature is higher than about 200 degrees Celsius, the electrode element material and the current collector may be harmed.

Also, it is preferable that the porous insulating layer is immediately dried after coating in order for it to not flow into the electrode layer, and the flow can be slightly reduced by slightly drying the electrode layer before the porous insulating layer is coated. The completely dried electrode manufactured by the above method is laminated with a separator in an order of a negative electrode, a separator, and a positive electrode and is assembled into a cell. A liquid electrolyte is then absorbed, and the whole embodiment is packed and manufactured into a secondary cell.

However, this embodiment relates to when the porous insulating layer is coated on at least one surface between the positive electrode and the negative electrode.

A cross-sectional view of a secondary cell using an electrode according to an exemplary embodiment of the present invention is shown in FIG. 3. The negative electrode 160 coated with the porous insulating layer from the above process is located at the bottom, and a separator 130 and a positive electrode 110 are laminated to thus organize the cell. The negative electrode 160 is in contact with the negative current collector 170 and the positive electrode 110 is in contact with the positive current collector 120. The surface of the negative electrode 160 is coated with a negative porous insulating layer. This organized assembly can form a cell after the liquid electrolyte is absorbed into it.

Also, the porous insulating layer may be coated on the surface of the positive electrode, and the porous insulating layer may be coated on both surfaces of the positive electrode 110 and the negative electrode 160.

EXEMPLARY EMBODIMENT

Hereinafter, a manufacturing method for an electrode, in particular, a negative electrode 160 according to the present invention in an exemplary embodiment, will be described in detail. However, the present invention is not restricted to these exemplary embodiments, and variables can be included in an object of the present invention.

For example, these can be similarly applied to the positive electrode 110, and can be applied to both the negative electrode 160 and the positive electrode 110.

FUNDAMENTAL EXEMPLARY EMBODIMENT

Non-Dried Electrode Manufacture

N-methylpyrrolidinone, a solvent for a binder, is added to a mixture of 91 wt % of carbon powder as a negative electrode material, 1 wt % of carbon black as a conductive material, and 8 wt % of polyvinylidene fluoride as a binder, and these are mixed for four hours in an oil stirrer to manufacture the negative mixture slurry, which contains 50% of solid content.

The negative slurry is coated on a copper foil negative current collector 170 of a 10 micron thickness by a doctor blade method at a thickness of 150 microns, such that the non-dried electrode is manufactured.

First Exemplary Embodiment

Powder Coating

Before the negative electrode from the fundamental exemplary embodiment is dried, silica powder with an average thickness of 100 microns is coated on the surface by a spray method. The coating thickness after drying is 3 microns.

The inorganic compound powder does not flow into the electrode layer due to the flow of slurry because it is immediately dried using a hot-air dryer operated at a temperature of about 30 at 120 degrees Celsius for five minutes after coating, and then the electrode is manufactured by roll pressing.

Second Exemplary Embodiment

Good Solvent Slurry Coating

The porous insulating layer slurry that is mixed in advance is coated on the surface by a spray method before the wet negative electrode obtained from the fundamental exemplary embodiment is dried.

The porous insulating layer slurry is manufactured by adding an electrode layer polymer binder and N-methylpyrrolidinone, a solvent thereof, to a mixture of 90 wt % of silica with an average diameter of 100 nm as an inorganic compound and a copolymer of 10 wt % of polyvinylidene fluoride-heaxfluoropropylene (PVdF-HFP) as a polymer binder, and it is mixed for four hours in an oil stirrer to manufacture a slurry with 10% solid content.

The coating thickness after drying is 3 microns, and the porous insulating layer slurry or the inorganic compound powder does not flow or mix into the electrode layer due to the flow of slurry because it is immediately dried in a hot-air dryer at a temperature of about 30 at 120 degrees Celsius for five minutes after coating, and then the electrode is manufactured by roll pressing.

Third Exemplary Embodiment

Poor Solvent/Non-Solvent Slurry Coating

The porous insulating layer slurry that is mixed in advance is coated on the surface by a spray method before the wet negative electrode obtained from the fundamental exemplary embodiment is dried.

The porous insulating layer slurry is manufactured by adding acetone, a poor solvent for the electrode layer polymer binder, to a mixture of 90 wt % of silica with an average diameter of 100 nm as an inorganic compound and a copolymer of 10 wt % of polyvinylidene fluoride-heaxfluoropropylene (PVdF-HFP) as a polymer binder, and it is mixed for four hours in an oil stirrer to manufacture a slurry with 10% solid content.

The coating thickness after drying is 3 microns, and the porous insulating layer slurry or the inorganic compound powder does not flow or mix into the electrode layer due to the flow of slurry because it is immediately dried in a hot-air dryer at a temperature of about 30 at 120 degrees Celsius for five minutes after coating, and then the electrode is manufactured by roll pressing.

Comparative Example

The non-dried electrode obtained from the fundamental exemplary embodiment is dried in a hot-air dryer at about 30 at 120 degrees Celsius for five minutes, so an electrode coated with only an electrode layer is manufactured. Then, the porous insulating layer slurry that is mixed in advance is coated by a spray method on the surface. The porous insulating layer slurry is manufactured by adding acetone, a poor solvent for the electrode layer polymer binder, to a mixture of 90 wt % of silica with an average diameter of 100 nm as an inorganic compound and a copolymer of 10 wt % of polyvinylidene fluoride-heaxfluoropropylene (PVdF-HFP) as a polymer binder, and it is mixed for four hours in an oil stirrer to manufacture a slurry with 10% solid content.

The coating thickness after drying is 3 microns, and an electrode is manufactured by drying it in a hot-air dryer at a temperature of about 30 at 120 degrees Celsius for five minutes after coating and performing a roll press method.

The difference between the comparative example and Exemplary Embodiments 1 to 3 is that, in the comparative example, the porous insulating layer is coated and dried after the electrode layer slurry is coated and perfectly dried.

The porous insulating layer can be coated after the electrode layer is completely dried and roll-pressed, but a much simple method is performed in the exemplary embodiment of the present invention.

Preparation Example

A positive mixed slurry is manufactured by adding a binder solvent, N-methylpyrrolidinone, to a mixture of 94 wt % of a lithium nickel cobalt manganese oxide complex (Li Ni1/3 Co1/3 Mn1/3 O2) as a positive electrode material, 3 wt % of carbon black as a conductive material, and 3 wt % of polyvinylidene fluoride as a binder, and mixing this in an oil stirrer for four hours in a like manner of the comparative example, and then the positive mixed slurry with 50% solid content can be obtained.

A positive electrode is manufactured by coating the positive electrode slurry at a thickness of 100 microns on the positive current collector 120, a thin film of aluminum, using a doctor blade method, and drying it for five minutes in a hot-air dryer at a temperature of about 30 at 120 degrees Celsius and roll-pressing it.

The respective negative electrode manufactured from Exemplary Embodiments 1 to 3 and the comparative example, the positive electrode manufactured from the preparation example, a negative plate and a positive plate cut to a predetermined size, and a usual separator for a secondary cell are sequentially laminated and assembled from the negative electrode, the separator, and the positive electrode.

The laminated material is put in an aluminum pouch, which is an external material, and secondary cells are manufactured by injecting the electrolyte solution that consists of an organic solution in which 1.1M of a LiPF6 lithium salt is dissolved in a mixed organic solution of EC and DEC (volume ratio=3:7) and sealing the pouch. The secondary cells are respectively called the first preparation example, the second preparation example, the third preparation example, and the comparative preparation.

The main factors according to the exemplary embodiments and the preparation example are shown in Table 1.

TABLE 1

Electrode composition according to the exemplary embodiments and preparation example

| Preparation example | Exemplary embodiment | Electrode layer | Porous insulating layer (Composition after drying and solid content (%)) | Characteristics |
|---|---|---|---|---|
| First preparation example | Exemplary Embodiment 1 | Fundamental exemplary embodiment | Inorganic compound: 100 | powder coating |
| Second preparation example | Exemplary Embodiment 2 | Negative electrode material: 91 Conductive material: 1 Binder: 8 | Inorganic compound: 90 Polymer binder: 10 | Good solvent slurry |
| Third preparation example | Exemplary Embodiment 3 | | | Poor solvent slurry |
| Comparative preparation example | Comparative Example | | | Conventional art |

Experimental Example 1

Capacity Retention and Life Characteristic Experiment According to Repeated Charging/Discharging of Secondary Cell The life characteristics of secondary cells manufactured from Preparation Examples 1 to 3 and the comparative preparation example are evaluated under the conditions and method below, and the results are graphed in FIG. 6. A secondary cell is charged at a constant current rate of 1.0 C in Experimental Example 1 until the voltage rises to 4.2V, the secondary cell is charged at a constant voltage of 4.2V until the current drops to 0.1 C, and the secondary cell is discharged at a constant current rate of 1.0 C until the voltage drops to 3.0V.

Figure 6:
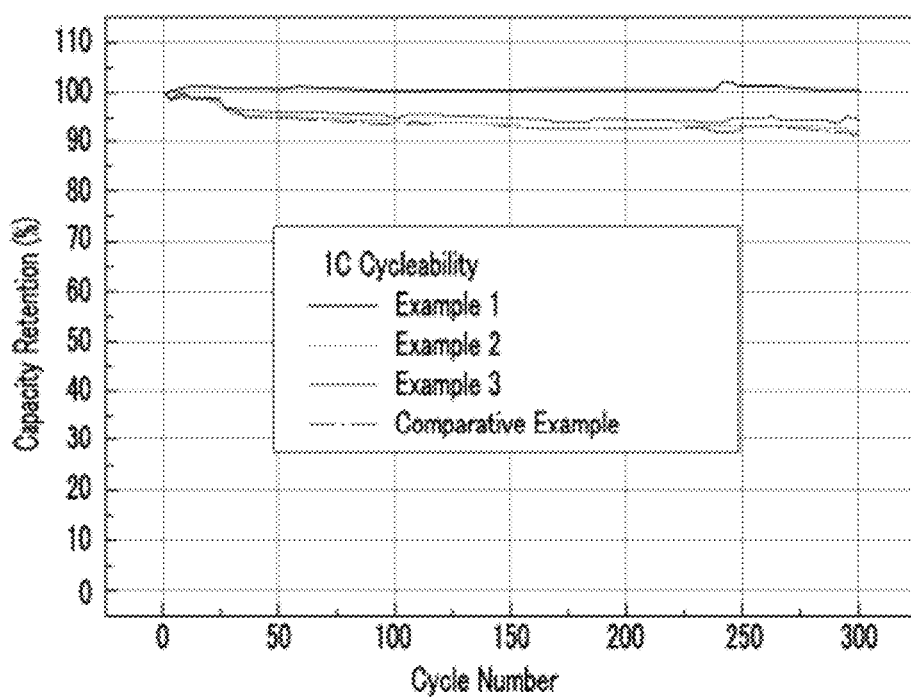
FIG. 6 is a graph showing experiment results of capacity retention and cycle number according to repeated charge/discharge of a secondary cell manufactured by examples of the present invention and a comparative example.

The secondary cells (Preparation Examples 1 to 3) made from the negative electrodes of Exemplary Embodiments 1 to 3 according to the present invention, as shown in FIG. 6, can fulfill the same or better performance in comparison with the secondary cell (comparative preparation example) made from the negative electrode of the conventional art according to the comparative example.

Experimental Example 2

Capability of Secondary Cell According to Applied Discharge Current

The discharge characteristic of secondary cells manufactured from Preparation Example 1 and the comparative preparation example are evaluated according to the conditions and method below, and the results are graphed in FIG. 7. A secondary cell is charged at a constant current rate of 1.0 C in Experimental Example 2 until the voltage rises to 4.2V, the secondary cell is charged at a constant voltage of 4.2V until the current drops to 0.1 C, and the secondary cell is discharged at a constant current rate of 0.5 C, 1.0 C, 2 C, and 5 C respectively until the voltage drops to 3.0V.

Figure 7:
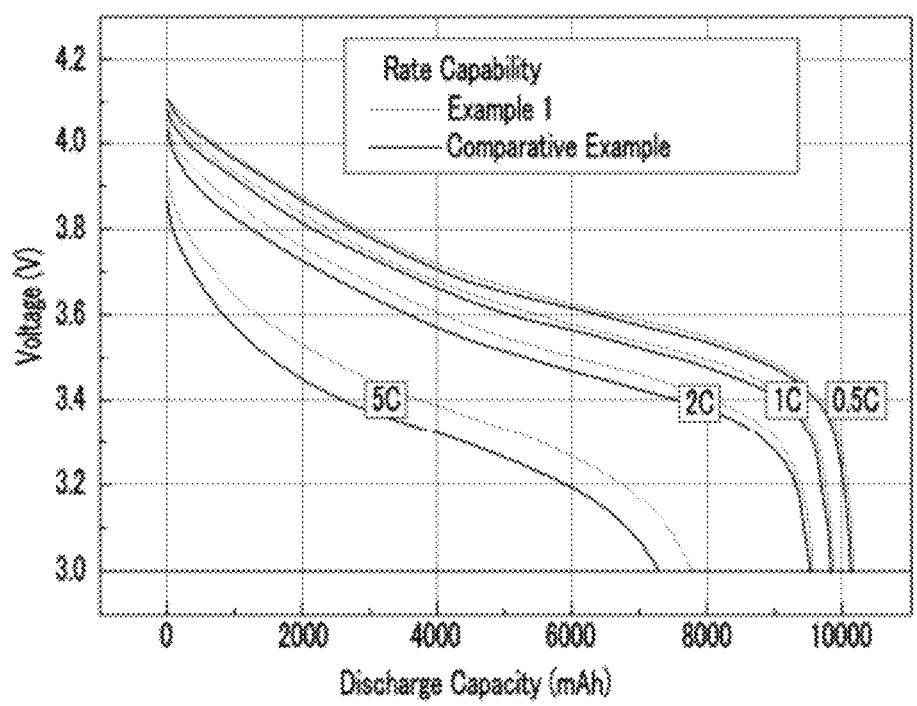
FIG. 7 is a graph showing results of a capacity determining experiment according to application of a discharge current of a secondary cell manufactured by the examples of the present invention and a comparative example.

The secondary cells (Preparation Example 1) made from the negative electrode of Exemplary Embodiment 1, as shown in FIG. 7, can fulfill the same or better performance in comparison with the secondary cell (comparative preparation example) made from the negative electrode of the conventional art according to the comparative example.

The reason is that the electrolyte moisture absorption and the ion conductance improve because the porous structure of negative electrode manufactured from Exemplary Embodiment 1 is formed better than the negative electrode manufactured from the comparative example.

Experimental Example 3

Overcharge Safety Measuring Experiment

Figure 8:
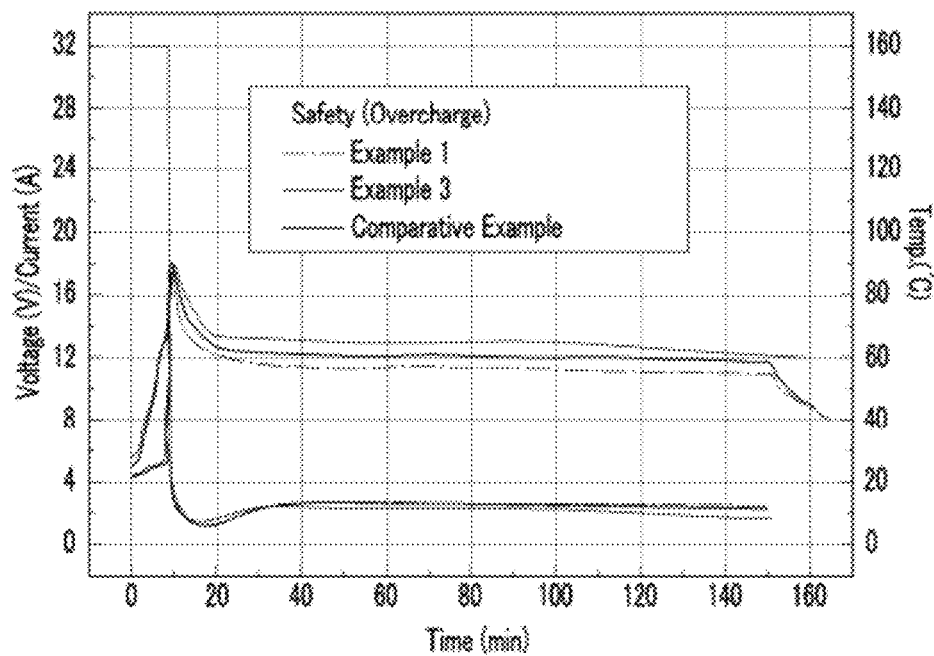
FIG. 8 is a graph showing experimental results of overcharging a secondary cell manufactured by the examples of the present invention and a comparative example.

An overcharge safety measuring experiment for Preparation Examples 1 to 3 and the comparative preparation example is fulfilled by the below conditions and method, and the results are graphed in FIG. 8.

The secondary cells manufactured from Preparation Examples 1 to 3 and the comparative preparation example are overcharged at a constant current of 32 A for 150 minutes until the voltage is 12V, and the voltage of the secondary cell and the surface temperature of the secondary cell are observed during that time.

In this test, the internal short circuit does not occur in the case of the Preparation Examples 1 to 3 and the comparative preparation example, and the maximum surface temperature of the cell is less than 100 degrees Celsius so it is safe.

The reason is that the thermal runaway is prevented by suppressing the internal short circuit between the positive electrode and the negative electrode by the porous insulating layer coated on the negative electrode although the internal temperature rises and the separator is deformed by thermal contraction. Unless the secondary cell has the porous insulating layer, or if the secondary cell uses an imperfect electrode, the internal short circuit of the cell usually occurs due to the thermal contraction deformation of the separator and the cell ignites because of the thermal runaway.

The cell is charged in Experimental Example 3 at constant current of 32 A until the voltage rises to 12V, and is overcharged by a constant voltage 12V for 150 minutes. The secondary cells (Preparation Examples 1 to 3) made from the negative electrode of Exemplary Embodiments 1 to 3, as shown in FIG. 8, can fulfill the same or better performance in comparison with the secondary cell (comparative preparation example) made from the negative electrode of the conventional art according to the comparative example.

This means that the porous insulating layer fulfills the same function in comparison with the conventional art.

As described above, the electrode of the secondary cell coated with the porous insulating layer of an appropriate thickness according to Experimental Examples 1 to 3 does not hinder the cell performance, and it can improve the cell performance in comparison with the conventional art by the enhancement of interfacial characteristics of the electrode or the enhancement of the electrolyte moisture absorption.

Also, we can see that the secondary cells according to the present invention can prevent the unsafe mechanism that induces the internal short circuit due to the thermal contraction of the separator in a variable abuse or misuse condition such as an overcharge of the cell and leads to the thermal runaway.

Figure 2:
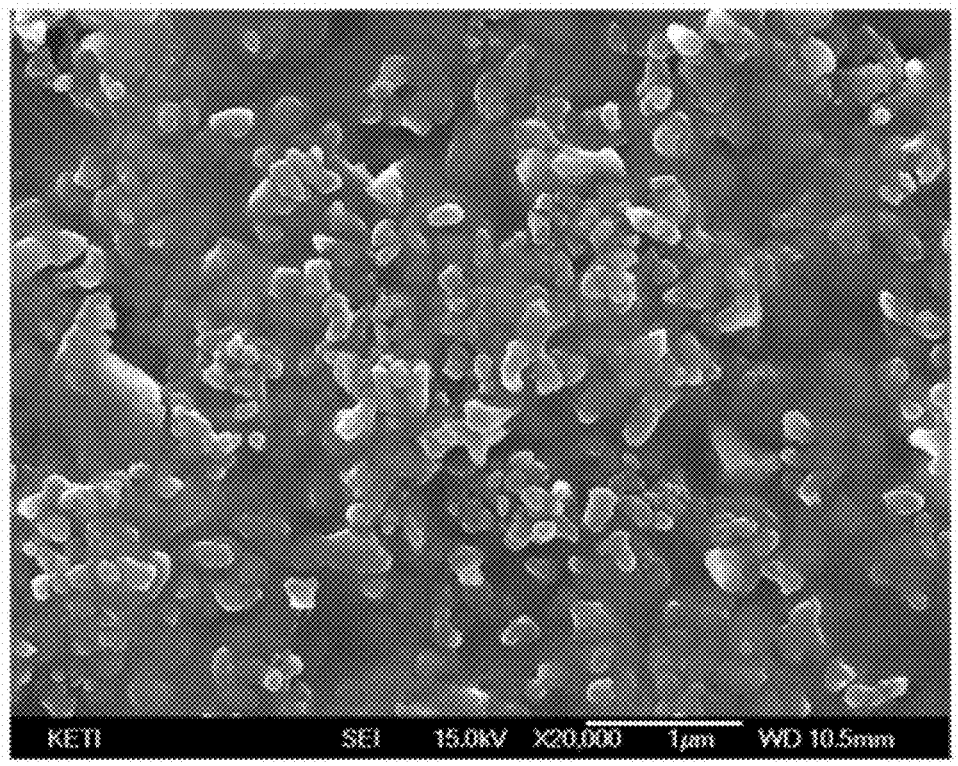
FIG. 2 is a SEM photograph of an electrode of a comparative example.
Figure 5:
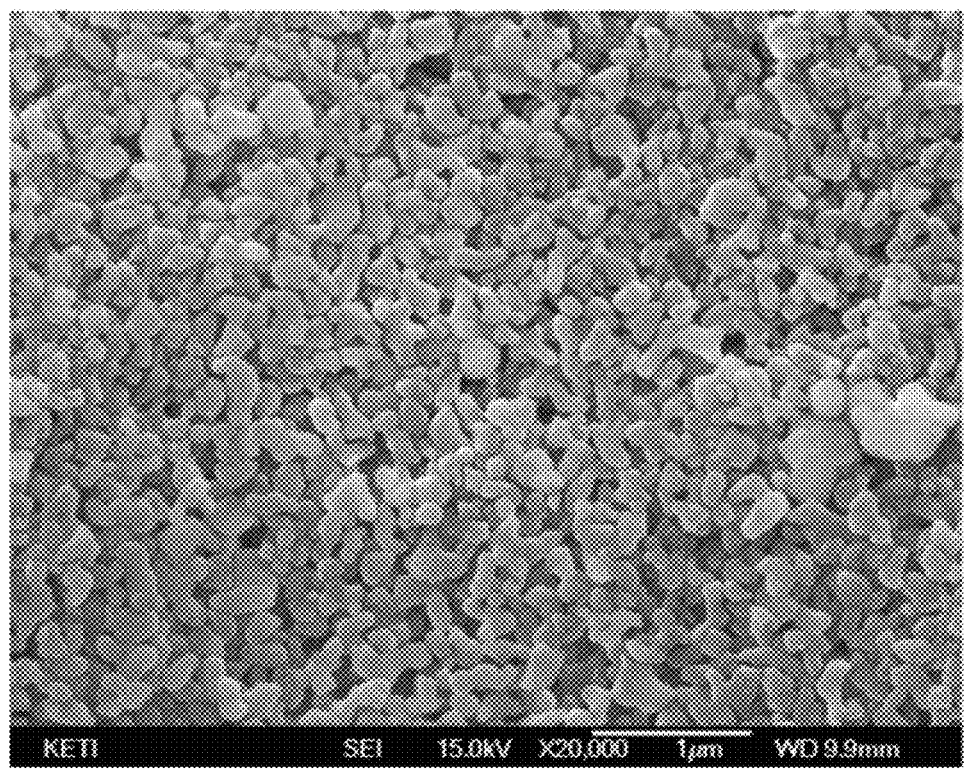
FIG. 5 is a SEM photograph of an electrode according to an exemplary embodiment of the present invention.

FIG. 5 is a SEM photograph of an electrode manufactured from Exemplary Embodiment 1 showing that the porous structure of the porous insulating layer manufactured from Exemplary Embodiment 1 is formed well, but we can see that the porous structure of the electrode layer coated first in the electrode manufactured from the comparative example shown in FIG. 2 is blocked by a binder including the porous insulating layer with a secondary coating.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A manufacturing method of a secondary cell electrode forming a porous insulating layer on at least one surface between a negative electrode and a positive electrode, comprising:
   coating an electrode layer slurry on the electrode surface;
   coating a porous insulating layer while in a state in which the electrode layer slurry has not been dried; and
   drying the electrode layer slurry,
   wherein the porous insulating layer is coated with only an inorganic compound powder or is coated with a mixed powder of the inorganic compound powder and functional inorganic compound additives,
   wherein the additives of the functional inorganic compound include at least one of $AlX_3$, $MgX_2$, and $SnX_2$,
   wherein X is a halogen, and
   wherein the additives of the functional inorganic compound are included at 0.1 to 10 wt % of the solid content of the porous insulating layer.

2. The manufacturing method of claim 1, wherein the electrode contains an active material, a conductive material, a polymer binder, and additives.

3. The manufacturing method of claim 2, wherein the active material is at least one of a graphite series or a carbon series when the electrode is a negative electrode, and the active material is at least one of a transition metal-oxide series, a transition metal-phosphate series, a transition metal-silicate series, a transition metal-sulphate series, or polymer materials when the electrode is a positive electrode.

4. The manufacturing method of claim 2, wherein the conductive material is at least one of graphite, carbon black, activated carbon, carbon nanotubes, and carbon nanofiber.

5. The manufacturing method of claim 2, wherein the polymer binder is at least one of a copolymer of polyvinylidene fluoride, vinylidene fluoride, heaxfluoropropylene, a copolymer of vinylidene fluoride, maleic anhydride, polyvinyl chloride, polyvinyl alcohol, polyvinyl formal, polymethylmethacrylate, polymethacrylate, tetraethylene glycol diacrylate, cellulose triacetate, polyurethane, polysulfone, polyether, polyolefine, polyethylene oxide, polyisobutylene, polybutyldiene, polyacrylonitrile, polyimide, acrylonitrile-butadiene rubber, styrene-butadiene rubber, an ethylene-propylene-diene monomer, polydimethylsiloxane, and polysilicone.

6. The manufacturing method of claim 1, wherein the inorganic compound powder is at least one of $SiO_2$, $Al_2O_3$, $TiO_2$, $SnO_2$, $ZnO$, $CeO_2$, $ZrO_2$, $BaTiO_3$, and $Y_2O_3$.

7. The manufacturing method of claim 6, wherein the size of the inorganic compound powder is 0.001 to 1 micron.

8. The manufacturing method of claim 6, wherein the content of the inorganic compound powder is 10 wt % or more of the porous insulating layer.

9. The manufacturing method of claim 1 wherein the coating thickness of the porous insulating layer after drying is 1 to 10 microns.

10. The manufacturing method of claim 1 wherein the electrode layer is dried at 50 to 200 degrees Celsius.

* * * * *